(12) United States Patent
Baudart et al.

(10) Patent No.: US 10,977,385 B2
(45) Date of Patent: Apr. 13, 2021

(54) CONFIGURABLE AND NON-INVASIVE PROTECTION OF PRIVATE INFORMATION FOR CONVERSATIONAL AGENTS

(71) Applicant: INTERNATIONAL BUSINESS MACHINES CORPORATION, Armonk, NY (US)

(72) Inventors: Guillaume A. Baudart, New York, NY (US); Evelyn Duesterwald, Millwood, NY (US); Martin Hirzel, Ossining, NY (US); Avraham Ever Shinnar, Hawthorne, NY (US); Julian Timothy Dolby, Bronx, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 396 days.

(21) Appl. No.: 15/914,306

(22) Filed: Mar. 7, 2018

(65) Prior Publication Data

US 2019/0278942 A1 Sep. 12, 2019

(51) Int. Cl.
*G06F 21/60* (2013.01)
*G06F 21/62* (2013.01)
(Continued)

(52) U.S. Cl.
CPC ...... *G06F 21/6254* (2013.01); *G06F 21/6263* (2013.01); *G06F 40/295* (2020.01); *H04L 51/02* (2013.01); *H04L 63/0428* (2013.01)

(58) Field of Classification Search
CPC ....... G06F 21/60; G06F 21/62; H04L 63/0428
(Continued)

(56) References Cited

U.S. PATENT DOCUMENTS 8,713,670 B2 4/2014 Levien et al.
2011/0107427 A1 5/2011 Cohen et al.
(Continued)

FOREIGN PATENT DOCUMENTS

WO WO 2015179286 A1 11/2015

OTHER PUBLICATIONS

Tombs et al., "It's Almost Like Talking to a Person': Student Disclosure to Pedagogical Agents in Sensitive Settings", Proceedings of the 9th International Conference on Networked Learning, May 2014, pp. 1-8.
(Continued)

*Primary Examiner* — Izunna Okeke
(74) *Attorney, Agent, or Firm* — Tutunjian & Bitetto, P.C.; Anthony Curro

(57) ABSTRACT

Methods and systems are provided for configurable and non-invasive protection of private information in a user input to a software application that handles real-time information. A method includes detecting, by a filter in real-time, private information in the user input. The method further includes forming, by the filter, a filtered user input from the user input, by maintaining non-private information from the user input in the filtered user input, extracting and encrypting the private information in the user input and attaching the encrypted private information to the filtered user input, and replacing the private information in the user input with unique identifiers in the filtered user input. The unique identifiers are configured to be exploitable by the software application to achieve an intended function of the software application for the user. The method also includes transmitting, by a communications redirector, the filtered user input over a communication channel.

23 Claims, 11 Drawing Sheets

(51) Int. Cl.
   *H04L 29/06*      (2006.01)
   *H04L 12/58*      (2006.01)
   *G06F 40/295*     (2020.01)

(58) Field of Classification Search
   USPC .......................... 713/164, 189, 161; 726/22
   See application file for complete search history.

(56)                References Cited

U.S. PATENT DOCUMENTS

2012/0110345 A1      5/2012  Pigeon et al.
   2013/0194301 A1      8/2013  Robbins et al.
   2014/0282464 A1      9/2014  El-Gillani
   2015/0082391 A1      3/2015  Lerman et al.
   2015/0278534 A1 *   10/2015  Thiyagarajan .......... G06F 21/84
                                                          726/28
   2015/0373021 A1     12/2015  Tussy
   2017/0187690 A1      6/2017  Lanciono et al.
   2018/0082068 A1 *    3/2018  Lancioni ............. G06F 21/6245
   2018/0176193 A1 *    6/2018  Davis ..................... H04L 63/06

OTHER PUBLICATIONS

Vaughan et al., "Inference of Expressive Declassification Policies", Proceedings of the 2011 IEEE Symposium on Security and Privacy (SP): May 2011, 17 pages.
International Search Report and Written Opinion dated May 31, 2019 for International Application No. PCT/EP2019/054898, 12 pages.

\* cited by examiner

600

| 610 | Hello! I can help you with the Computer Store. What would you like to do? |

| 611 | Order a personal apple 13 inches |

| 620 | I have an apple laptop with a 13 inch screen for personal use. Would you like me to place the order? |

| 621 | Yes |

| 630 | What credit card number should we use to place this order? |

| 631 | Please use my VISA 4532040206203445 |

| 640 | The order has been placed using your Visa. Your order number is 4532-011a9-3445 |

| 641 | Just in case my SSN is 123 213 2323 |

FIG. 6

| | |
|---|---|
| Hello! I can help you with the Computer Store. What would you like to do? | 610 |

| | |
|---|---|
| 611 | Order a personal apple 13 inches |

| | |
|---|---|
| I have an apple laptop with a 13 inch screen for personal use. Would you like me to place the order? | 620 |

| | |
|---|---|
| 621 | Yes |

| | |
|---|---|
| What credit card number should we use to place this order? | 630 |

| | |
|---|---|
| 741 | Please use my VISA XXXX-XXXX-XXXX-3445 |

| | |
|---|---|
| The order has been placed using your Visa. Your order number is 4532-011a9-3445 | 640 |

| | |
|---|---|
| 741 | Just in case my SSN is XXX-XX-2323 |

FIG. 7

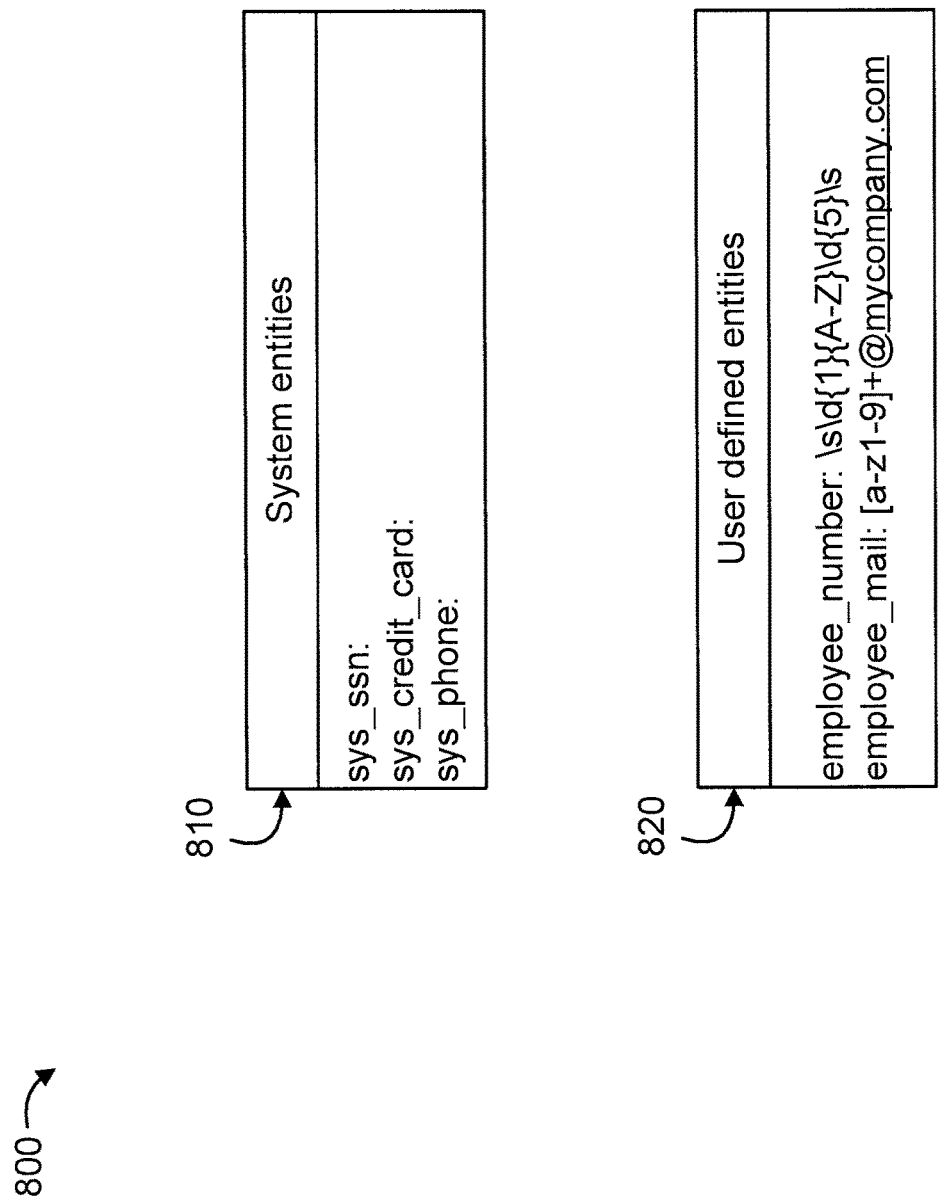

CONFIGURABLE AND NON-INVASIVE PROTECTION OF PRIVATE INFORMATION FOR CONVERSATIONAL AGENTS

BACKGROUND

Technical Field

The present invention relates generally to information processing and, in particular, to configurable and non-invasive protection of private information for conversational agents.

Description of the Related Art

There is a trend involving companies offering conversational agents such as chatbots to their customers and employees to answer questions, enable self-service, and so forth. However, chatbots may request private information (e.g., banking chatbots), or users may inadvertently input private information (e.g., social security number). Accordingly, private information should be handed in a secure manner with respect to, for example, communications, logging, and so forth. The mishandling of private information can lead to law violations, loss of credibility, legal actions, loss of customers, and so forth. Hence, there is a need for configurable and non-invasive protection of private information for conversational agents.

SUMMARY

According to an aspect of the present invention, a computer-implemented method is provided for configurable and non-invasive protection of private information in a user input to a software application that handles real-time information. The method includes detecting, by a filter in real-time, private information in the user input. The method further includes forming, by the filter, a filtered user input from the user input, by maintaining non-private information from the user input in the filtered user input, extracting and encrypting the private information in the user input and attaching the encrypted private information to the filtered user input, and replacing the private information in the user input with unique identifiers in the filtered user input. The unique identifiers are configured to be exploitable by the software application to achieve an intended function of the software application for the user. The method also includes transmitting, by a communications redirector, the filtered user input over a communication channel.

According to another aspect of the present invention, a computer program product is provided for configurable and non-invasive protection of private information in a user input to a software application that handles real-time information. The computer program product includes a non-transitory computer readable storage medium having program instructions embodied therewith. The program instructions are executable by a computer having a filter and a communications redirector to cause the computer to perform a method. The method includes detecting, by the filter in real-time, private information in the user input. The method further includes forming, by the filter, a filtered user input from the user input, by maintaining non-private information from the user input in the filtered user input, extracting and encrypting the private information in the user input and attaching the encrypted private information to the filtered user input, and replacing the private information in the user input with unique identifiers in the filtered user input. The unique identifiers are configured to be exploitable by the software application to achieve an intended function of the software application for the user. The method also includes transmitting, by the communications redirector, the filtered user input over a communication channel.

According to yet another aspect of the present invention, a system is provided for configurable and non-invasive protection of private information in a user input to a software application that handles real-time information. The system includes a filter for detecting, in real-time, private information in the user input and for forming a filtered user input from the user input, by maintaining non-private information from the user input in the filtered user input, extracting and encrypting the private information in the user input and attaching the encrypted private information to the filtered user input, and replacing the private information in the user input with unique identifiers in the filtered user input. The unique identifiers are configured to be exploitable by the software application to achieve an intended function of the software application for the user. The system further includes a communications redirector for transmitting the filtered user input over a communication channel.

According to still another aspect of the present invention, a computer-implemented method is provided for configurable and non-invasive protection of private information in a user input to a conversational agent that handles real-time information. The method includes detecting, by a filter in real-time, private information in the user input. The method further includes forming, by the filter, a filtered user input from the user input, by maintaining non-private information from the user input in the filtered user input, extracting and encrypting the private information in the user input and attaching the encrypted private information to the filtered user input, and replacing the private information in the user input with unique identifiers in the filtered user input. The unique identifiers are configured to be exploitable by the software application to achieve an intended function of the conversational agent for the user. The method also includes transmitting, by a communications redirector, the filtered user input over a communication channel.

According to a further aspect of the present invention, a system is provided for configurable and non-invasive protection of private information in a user input to a conversational agent that handles real-time information. The system includes a filter for detecting, in real-time, private information in the user input, and for forming a filtered user input from the user input, by maintaining non-private information from the user input in the filtered user input, extracting and encrypting the private information in the user input and attaching the encrypted private information to the filtered user input, and replacing the private information in the user input with unique identifiers in the filtered user input. The unique identifiers are configured to be exploitable by the software application to achieve an intended function of the conversational agent for the user. The system further includes a communications redirector for transmitting the filtered user input over a communication channel.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 6 is a chart showing an exemplary conversation between a person and a conversational agent to which the present invention can be applied, in accordance with an embodiment of the present invention;

FIG. 7 is a chart showing an exemplary conversation between a person and a conversational agent using private information protection, in accordance with an embodiment of the present invention;

FIG. 8 is a diagram showing exemplary secured entities to which the present invention can be applied, in accordance with an embodiment of the present invention;

DETAILED DESCRIPTION

The present invention is directed to configurable and non-invasive protection of private information for conversational agents (interchangeably referred to herein as "chatbots" in short). As used herein, the term "private information" refers to sensitive, personal, and/or otherwise confidential information. Hence, the term "private information" is used interchangeably herein with respect to any of sensitive information, confidential information, personal information, Personally Identifiable Information (PII), and so forth, as readily appreciated by one of ordinary skill in the art.

In an embodiment, the present invention advantageously protects private information with minimal alterations to the conversational agent(s). In this way, the private information of a user can be protected from, for example, unwanted exposure, while still achieving the underlying goal of a communication between the user and a conversational agent.

In an embodiment, the present invention provides a mechanism to non-intrusively protect an existing (and possibly already deployed) chatbot from exposure to private information by intercepting the conversation between a chatbot and an end-user and transparently redacting sensitive information through the use of secured entities.

In an embodiment, the use of secured entities allows the chatbot to continue to operate on the type of sensitive information that was included in the user input without revealing the private/sensitive aspect to the chatbot. If sensitive information was simply deleted or blacked out, then the chatbot operation would likely be negatively impacted as the chatbot may no longer be able to understand user intent with the missing or blacked out information. The use of secured entities in accordance with one or more embodiments of the present invention ensures that chatbot operation is not impacted or changed by the inserted redaction. The private information can be encrypted and decrypted transparently as needed for authorized functions.

Hence, in an embodiment, when a natural language user input to a chatbot includes private information, the present invention preserves the privacy of the private information while still enabling limited computation over it. Further aspects of various embodiments of the present invention are described below.

Figure 1:
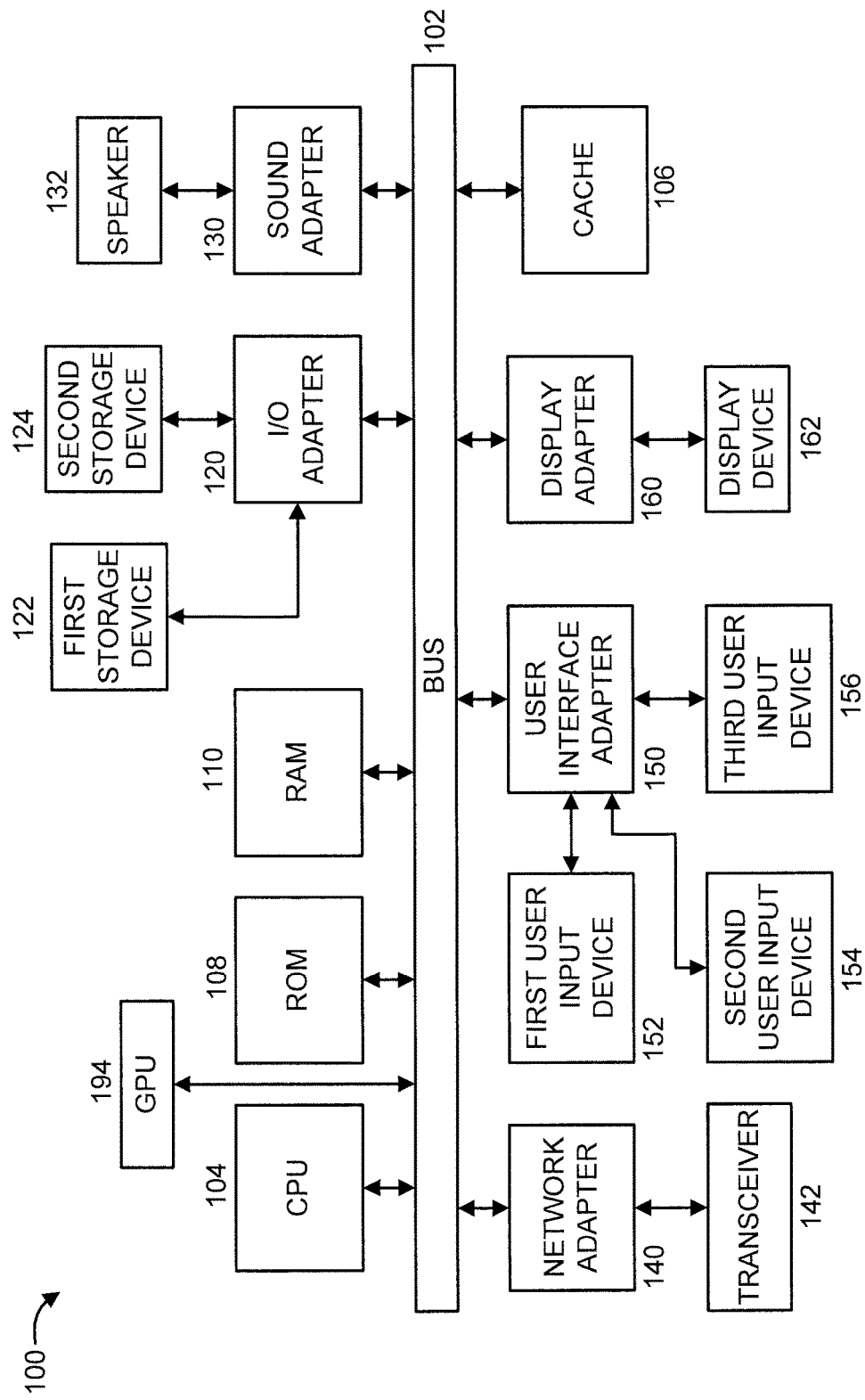
FIG. 1 is a block diagram showing an exemplary processing system to which the invention principles may be applied, in accordance with an embodiment of the present invention.

FIG. 1 is a block diagram showing an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. At least one Graphics Processing Unit (GPU) 194 is operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
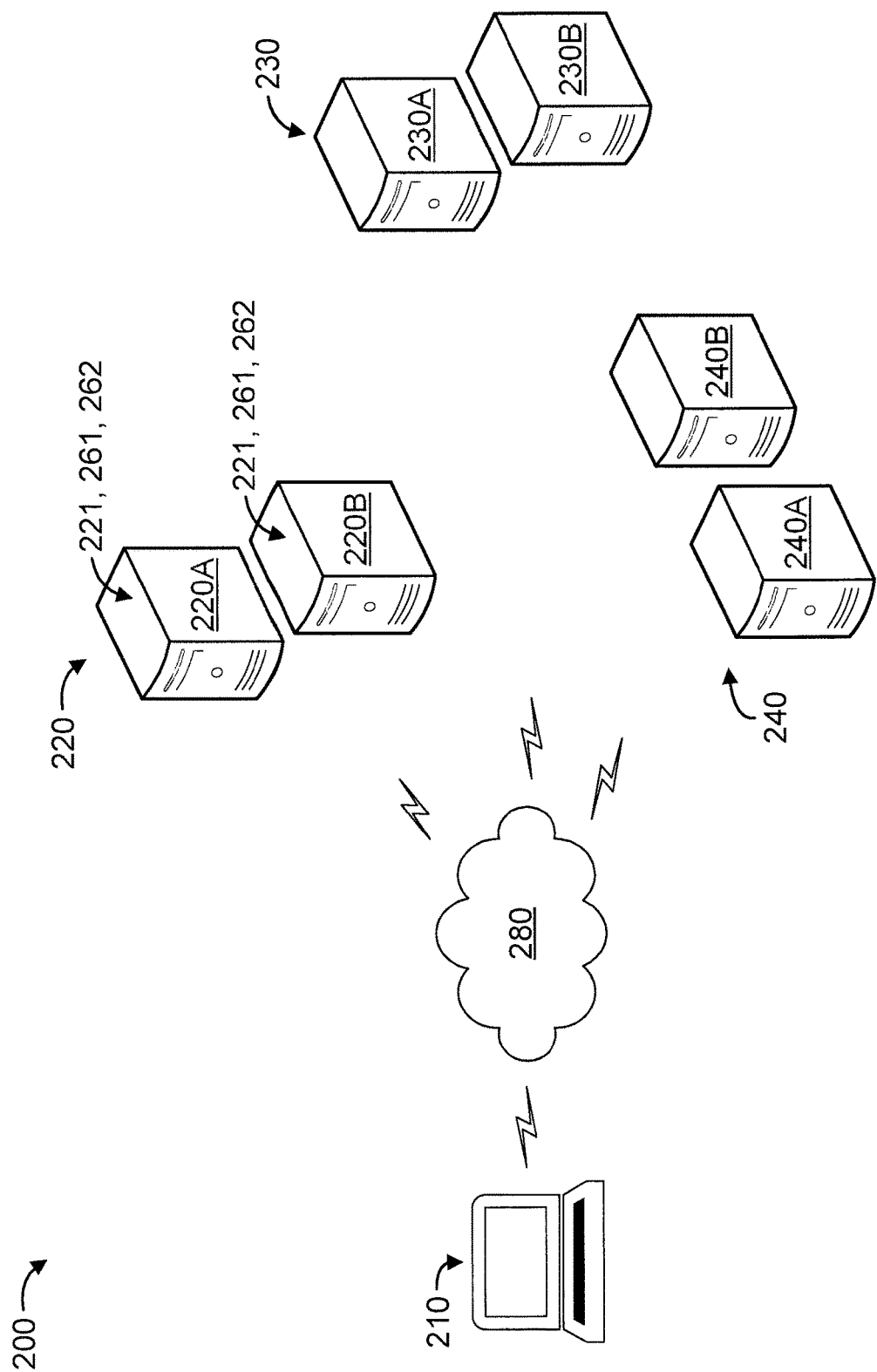
FIG. 2 is a block diagram showing an exemplary environment to which the present invention can be applied, in accordance with an embodiment of the present invention.

Moreover, it is to be appreciated that environment 200 described below with respect to FIG. 2 is an environment for implementing respective embodiments of the present invention. Part or all of processing system 100 may be implemented in one or more of the elements of environment 200.

Figure 3:
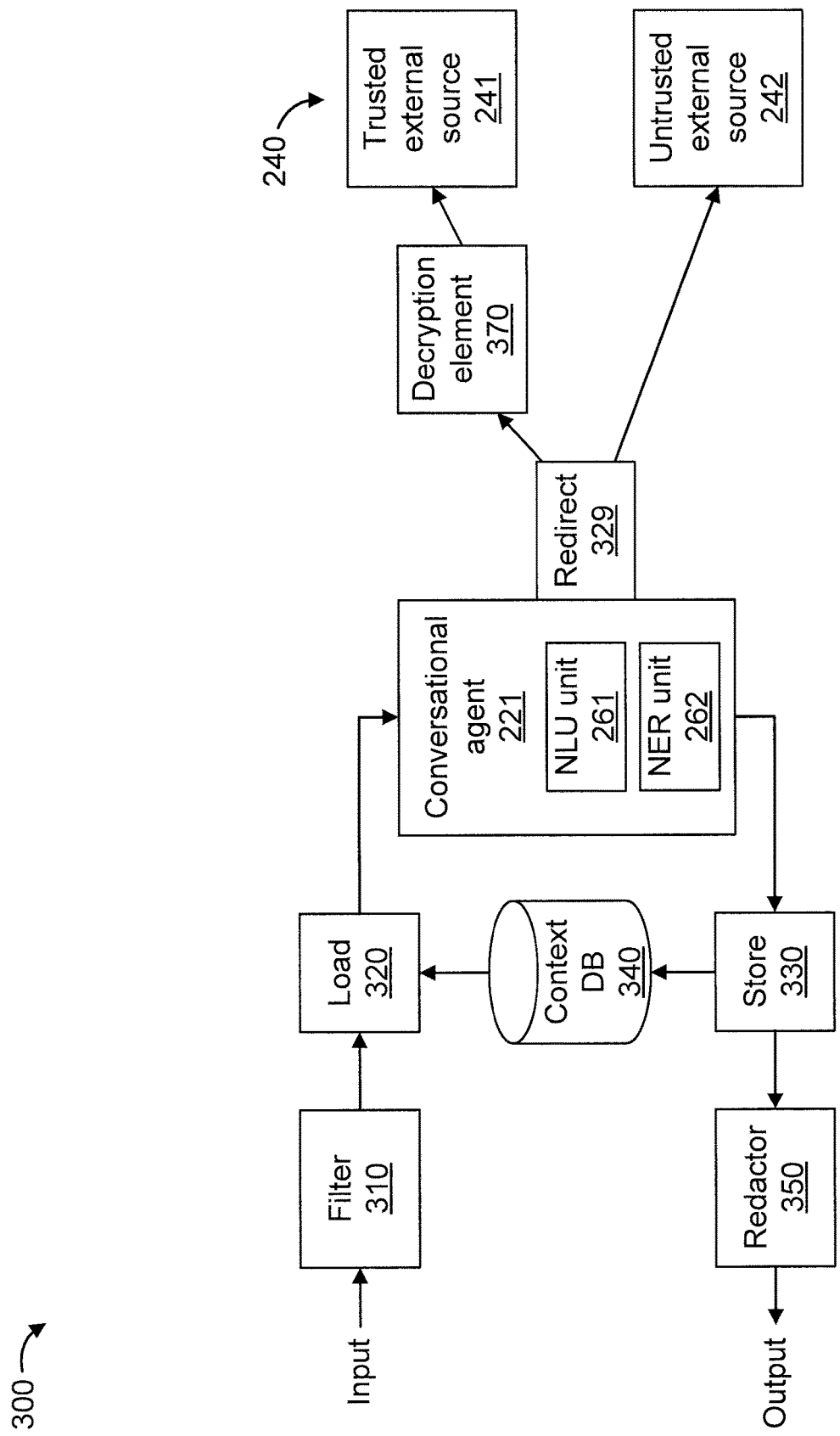
FIG. 3 is a block diagram showing an exemplary environment to which the present invention can be applied, in accordance with an embodiment of the present invention.

Also, it is to be appreciated that environment 300 described below with respect to FIG. 3 is an environment for implementing respective embodiments of the present invention. Part or all of processing system 100 may be implemented in one or more of the elements of environment 300.

Figure 4:
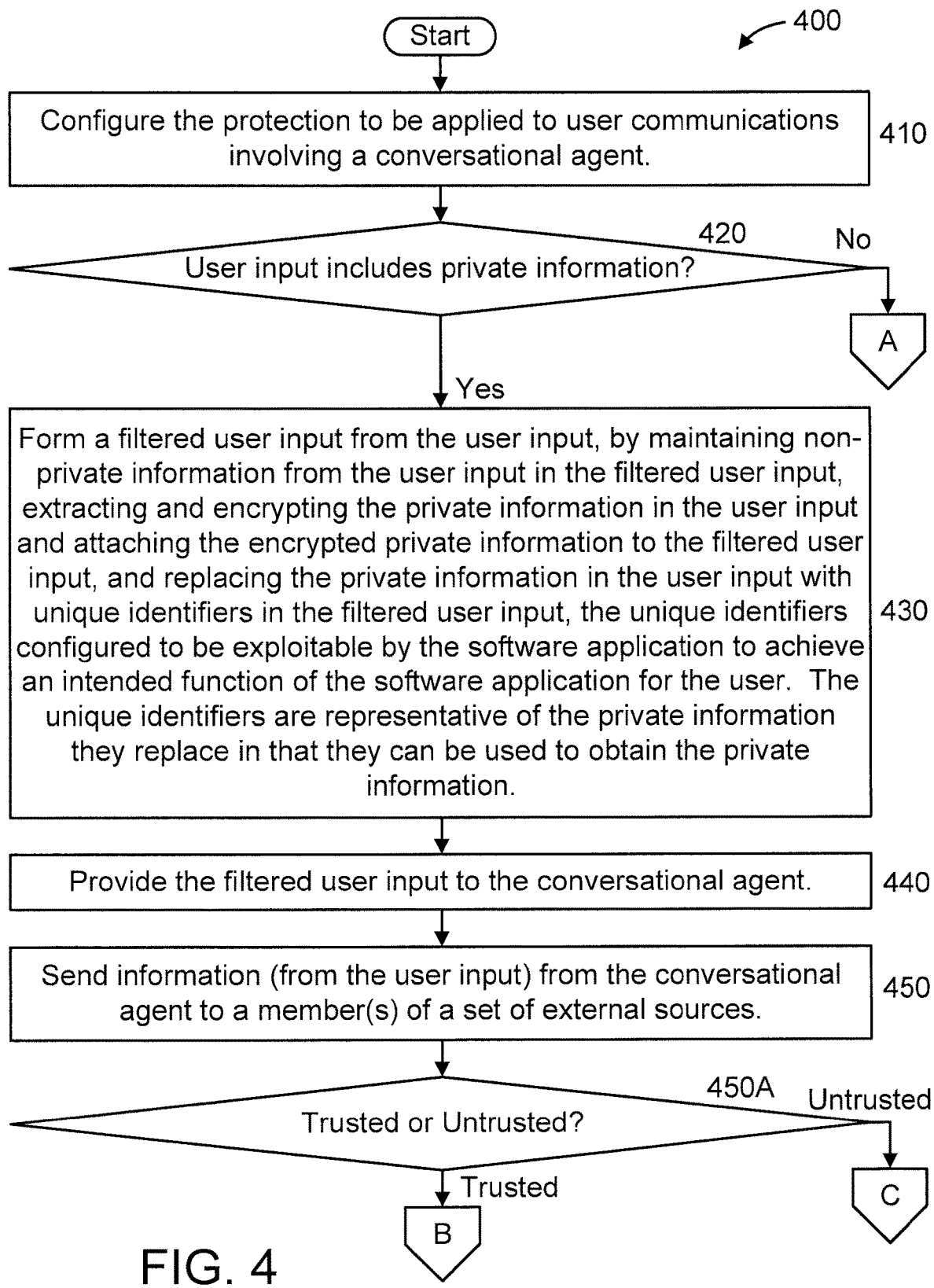
FIGS. 4-5 are block diagrams showing an exemplary method for configurable and non-invasive protection of private information for a conversational agent, in accordance with an embodiment of the present invention.

Further, it is to be appreciated that processing system 100 may perform at least part of the method described herein including, for example, at least part of method 400 of FIG. 4. Similarly, part or all of environment 200 may be used to perform at least part of method 400 of FIG. 4. Additionally, part or all of environment 300 may be used to perform at least part of method 400 of FIG. 4.

FIG. 2 is a block diagram showing an exemplary environment 200 to which the present invention can be applied, in accordance with an embodiment of the present invention.

The environment 200 includes a set of user devices (hereinafter interchangeably referred to as "user device set") 210, a set of conversational agent deploying devices (hereinafter interchangeably referred to as "conversational agent device set") 220, a set of protection devices (hereinafter interchangeably referred to as "protection device set") 230, and a set of external sources (hereinafter interchangeably referred to as "external sources set") 240 that can include a subset of trusted external sources 241 and a subset of untrusted external sources 242. It is to be appreciated that the numbers of members of each of the aforementioned sets has been chosen arbitrarily for the sake of illustration. Accordingly, in other embodiments, any number of members can be involved in each of the aforementioned groups.

Members of the user device set 210 interface with members of the conversational agent device set 220 for the purpose of conducting conversations there between. Members of the protection device set 230 non-intrusively oversee the conversations in order to protect any private information provided during such conversations. Members of the external sources set 240 use the private information provided by the user for an intended purpose including, but not limited to, for example, shopping, identify verification, authorized access, banking, and so forth. It is to be appreciated that the preceding listing is merely illustrative and, thus, other intended purposes can also be involved, while maintaining the spirit of the present invention.

Members of any of the sets 210, 220, 230, and 240 can be implemented by a myriad of processor-based computing devices including, but not limited to, smart phones, media devices, tablets, laptop computers, desktop computers, servers, smart devices, cloud based devices and systems, and so forth. It is to be appreciated that the preceding listing is merely illustrative and, thus, other types of devices can also be used in accordance with the teachings of the present invention, while maintaining the spirit of the present invention.

For the sake of illustration, set 210 is implemented by a laptop, and each of sets 220, 230, and 240 is implemented by a respective pair of servers, namely (220A and 220B), (230A and 230B), and (241 and 242), respectively.

The conversational agent device set 220 can correspond to any entity which may deploy a conversational agent 221. Accordingly, the entity can be, for example, but is not limited to, a store, a company, an organization, a group, a government entity, and so forth. Similarly, the set of external sources 240 can correspond to any entity which can use information obtained from a conversational agent 221 and, thus, can be for example, but is not limited to, a store, a company, an organization, a group, a government entity, and so forth. It is to be appreciated that the preceding entities are merely illustrative and, thus, the present invention can be employed by these and various other entities, as readily appreciated by one of ordinary skill in the art, given the teachings of the present invention provided herein, while maintaining the spirit of the present invention.

Members of the protection device set 230 are configured to perform configurable and non-invasive protection of private information in accordance with the present invention. In this way, any private information involved in a conversation between a user (e.g., using tablet 210A) and a conversational agent 221 deployed by a server (e.g., any of servers 210A and 210B) can be protected from, for example, unwanted exposure. Members of the protection device set 230 can be configured to intercept and act upon communications between members of the user device set 210 and the conversational agent device set 220.

Members of the set of external sources 240 are devices which process the information obtained from the user by the conversational agent. As noted above, from among the set of external sources 240, there can be trusted external sources 241 and untrusted external sources. The conversational agent 221 can redirect and/or otherwise send a filtered user input to an external source, where the private information in the filtered user input is selectively restored (decrypted) depending upon the status of the external source as either trusted or untrusted such that selective decryption is only performed for the trusted external sources 241.

In an embodiment, each conversational agent 221 and/or each member of protection device set 230 is implemented to include and/or otherwise involve a Natural Language Understanding (NLU) unit 261 with a Named Entity Recognition (NER) unit 262, as shown in FIG. 3. The units 261 and 262 are configured to enable the conversational agents 221 to exploit the unique, but innocuous, identifiers that replace the private information. In an embodiment, the filter 231 is part of the protection device set 230. In another embodiment, the filter 231 can be a stand-alone element. In an embodiment, the filter 231 communicates with the protection device set 230 but resides in the user device set 210 in order to filter the user input at the point of origin and prevent personal information from being communicated over a communication channel(s) that may or may not be secure.

In an embodiment, the members of the sets 210, 220, and 230 can communicate using one or more networks, collectively denoted by the figure reference numeral 280. In the embodiment of FIG. 2, wireless communication is used. However, in other embodiments, other types of communications can be used, including wired communications.

Moreover, in an embodiment, at least one of the elements of environment 200 is processor-based. Further, while one or more elements may be shown as separate elements, in other embodiments, these elements can be combined as one element. For example, while shown separately, the sets 220 and 230 can be combined into a single set, where each member of the combined set is capable of deploying a conversational agent and also protect any private information provided to the conversational agent. In this way, a single device in the combined set can, for example, both converse with the user and also protect any private information provided by the user. Such an implementation preferably includes a firewall and/or other protection(s) between the respective functions of the combined entities. The converse is also applicable, where while one or more elements may be part of another element, in other embodiments, the one or more elements may be implemented as standalone elements. Moreover, one or more elements of FIG. 2 can be implemented in a cloud configuration including, for example, in a distributed configuration. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 200 are readily determined by one of ordinary skill in the art, given the teachings of the present invention provided herein, while maintaining the spirit of the present invention.

FIG. 3 is a block diagram showing an exemplary environment 300 to which the present invention can be applied, in accordance with an embodiment of the present invention. The environment 300 shows additional details relative to those shown with respect to environment 200 of FIG. 2, for the sakes of illustration and clarity.

The architecture 300 includes and/or otherwise involves a filter 310, a load processor 320, a conversational agent 221, a redirect operation (interchangeably referred to herein as "communication redirector" or "redirector" in short) 329, a store processor 330, a context database (DB) 340, a redactor 350, and a set of external sources 360 that include trusted external sources 361 and untrusted external sources 362. While some of the preceding elements are characterized as processors or operations, in other embodiments they can be implemented in other forms. For example, in an embodiment, each of the processors can instead be implemented by a respective set of functions. Other variations are readily determined by one of ordinary skill in the art, while maintaining the spirit of the present invention.

The filter 310 is configured to receive a user input, filter private information in the user input and output a filtered user input. The filter 310 filters the private information to form and output a filtered user input by encrypting the private information, attaching the encrypted private information (to the filtered user input that is output from the filter 310), and replacing the private information with one or more unique identifiers. In this way, the filtered user input still includes the private information, albeit in encrypted form, and also includes unique identifiers representative of the private information that can be exploited by the NLE unit 261 and NER unit 262 of the conversational agent 221.

The filtered user input is then provided the conversational agent 221 by the load processor 320. Since any private information in the (unfiltered) user input has been filtered out by the filter 310 and replaced by the one or more unique identifiers, the filtered user input is safe to provide to the conversational agent 221 which will be unable to log any private information given its removal from the filtered user input provided to the conversational agent 221. Moreover, it is to be appreciated that the filtered user input is safe to communicate over communication channels including unsecure communication channels, since the unique identifiers will not be decodable (i.e., able to be decrypted) by any intervening entities.

The conversational agent 221 sends the filtered user input to an external source 240, which is intercepted by the redirector 329 before reaching the external source 240. In this way, the redirector 329 first determines whether an intended external source (hereinafter "target external source") is trusted or untrusted. If the external source is determined to be trusted (e.g., trusted external source 241 of FIG. 2), then the private information is decrypted and output to the external source. If the external source is determined to be untrusted (e.g., untrusted external source 242 of FIG. 2), then the private information is redacted and output to the external source. In this way, the redirector 329 essentially filters encrypted information such that even a trusted service can only see information that it is allowed (e.g., preauthorized) to see. Decryption of the private information is performed by decryption elements 370, which receive authorization to decrypt from the redirector 329. In an embodiment, the decryption elements 370 can be part of the protection device set 230.

In further detail, in an embodiment, the redirector 329 intercepts requests to the external sources and, based on a pre-configured whitelist of authorized external sources, instead of directly calling the source, triggers a pipeline that includes the decryption elements 370 to decode (decrypt) the encrypted private information.

The redactor 350 replaces the identifiers (previously used to replace the private information) in the filtered user input with redacted, human-readable text (e.g., XXXX-XXXX-XXXX-7807 for a credit card).

In an embodiment, the present invention can provide an additional layer of security by maintaining its own version of a conversational context using the load and store processors 320 and 330, respectively. The load processor 320 and store processor 330 are used to interact with the context database 340. In an embodiment, the load processor 320 is able to retrieve context information from the database for multiple uses including, but not limited to, detecting private information in a user input, private information replacement, and so forth. The copy of the context maintained in the context database 340 allows the protection of the private context even if the application client (e.g., 210 in FIG. 2) is compromised, as the application client usually maintains their own context information. The private part of the context can thus be separately managed by the present invention and redacted from the response returned to the client application (element 210 in FIG. 2).

In an embodiment, the context can be split into two parts as follows: (1) public context variables set by the client application that can be used to communicate information to the conversational agent 221 outside user inputs; and (2) private context that include all the information required to resume the conversation between turns.

In the embodiment shown in FIG. 3, the elements thereof are interconnected by one or more network(s) (not shown). However, in other embodiments, other types of connections can also be used. Moreover, in an embodiment, at least one of the elements of environment 300 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of FIG. 3 can be implemented in a cloud configuration including, for example, in a distributed configuration. Additionally, one or more elements in FIG. 3 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 300 are readily determined by one of ordinary skill in the art, given the teachings of the present invention provided herein, while maintaining the spirit of the present invention.

Figure 5:
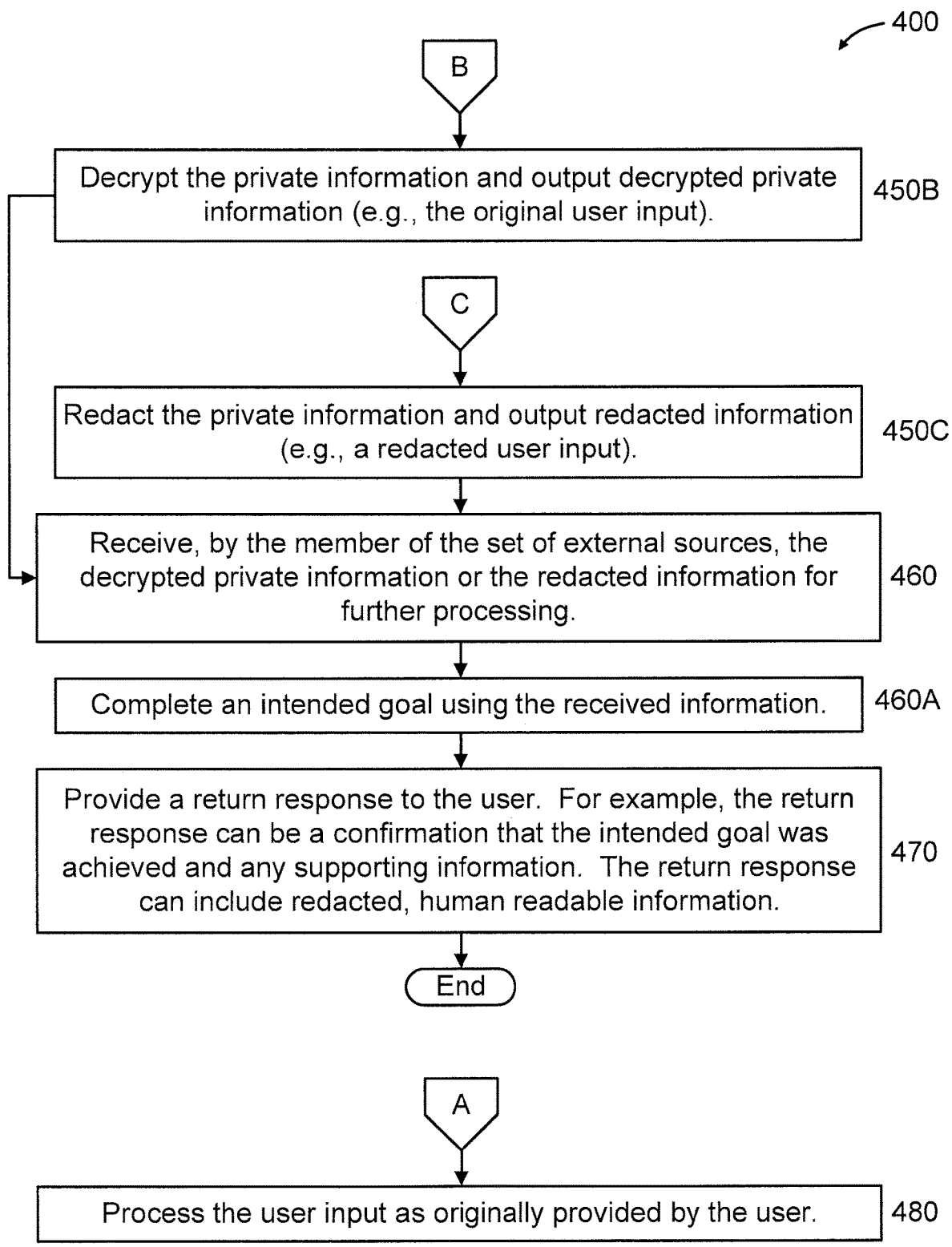

FIGS. 4-5 are flow diagrams showing an exemplary method 400 for configurable and non-invasive protection of private information for a conversational agent, in accordance with an embodiment of the present invention.

Referring to FIG. 4, at block 410, configure the protection to be applied to user communications involving a conversational agent. For example, in an embodiment, private information is characterized accordingly in order to enable subsequent detection thereof. The characterization of private information can include system characterizations and user characterizations. Moreover, the protection can be configured based on action types that include authorized action types and unauthorized action types. It is to be appreciated that block 410 can be performed repeatedly to modify the protection applied to the user communications involving the conversational agent.

At block 420, determine if a user input includes private information. If so, then proceed to block 430. Otherwise, proceed to block 480. As an example, the user input at block 420 can be, for example, but is not limited to, the following: "My SSN is 123-230-2323".

At block 430, form a filtered user input from the user input, by maintaining non-private information from the user input in the filtered user input, extracting and encrypting the private information in the user input and attaching the encrypted private information to the filtered user input, and replacing the private information in the user input with unique identifiers in the filtered user input, the unique identifiers configured to be exploitable by the software application to achieve an intended function of the software application for the user. The unique identifiers are representative of the private information they replace in that they can be used to obtain the private information. As an example, the above user input provided at block 420 can be replaced by the following: "My SSN is _SSN_001" with the attached encrypted data "data: {_SSN_001: aer134asd23}". The attached data links the identifier (i.e., "_SSN_001") with the encrypted data (i.e., "data: {_SSN_001: aer134asd23}"). Thus, relative to the example, the private information "123-230-2323" representing the user's social security number has been replaced with the following data identifier "_SSN_001".

At block 440, provide the filtered user input to the conversational agent. In an embodiment, a call function can be used for block 440.

At block 450, send information (from the user input) from the conversational agent to a member(s) of a set of external sources. In this way, an intended purpose of the conversation between the user and the conversational agent is accomplished. As an example, the record request can be in the following form: "getRecord(data.SSN_001)", with "data: {_SSN_001: aer134asd23}".

In an embodiment, block 450 can include one or more of blocks 450A-450C.

At block 450A, determine whether or not the member of the set of external sources is trusted or untrusted. If trusted, then proceed to block 450B. If untrusted, then proceed to block 450C.

Referring to FIG. 5, at block 450B, decrypt the private information and output decrypted private information (e.g., the original user input).

At block 450C, redact the private information and output redacted information (e.g., a redacted user input).

At block 460, receive, by the member of the set of external sources, the decrypted private information or the redacted information for further processing.

In an embodiment, block 460 can include block 460A.

At block 460A, complete an intended goal using the received information. For example, the member of the set of external sources can further process the received information in order to complete a transaction, provide authorized access (by, e.g., unlocking a computer-implemented lock or unlocking a physical lock, etc.), process payment with credit card number, verify identity with SSN or passport number, complete money transfer with routing number, make a phone call to a number, send email to a personal email address, verify employee record from employee number, and so forth.

At block 470, provide a return response to the user. For example, the return response can be a confirmation that the intended goal was achieved and any supporting information. In an embodiment, the return response can include redacted, human readable information, e.g., XXX-XX-123 for a SSN or XXXX-XXXX-XXXX-1234 for a credit card number.

At block 480, process the user input as originally provided by the user. Hence, in the absence of private information being present in the user input, the user input can be conventionally processed.

FIG. 6 is a chart showing an exemplary conversation 600 between a person (hereinafter "user") and a conversational agent (e.g., a chatbot) to which the present invention can be applied, in accordance with an embodiment of the present invention.

In the chart of FIG. 6, portions of the conversation 600 made by the conversational agent are shown on the left side of FIG. 6, while portions of the conversation 600 made by the user are shown on the right side of FIG. 6.

Initially, at block 610, the conversational agent says the following to the user: "Hello! I can help you with the Computer Store. What would you like to do?"

At step 611, the user replies as follows: "Order a personal apple 13 inches".

At step 620, the conversational agent says the following to the user: "I have an apple laptop with a 13 inch screen for personal use. Would you like me to place the order?"

At step 621, the user replies as follows: "Yes".

At step 630, the conversational agent says the following to the user: "What credit card number should we use to place this order?".

At step 631, the user replies as follows: "Please use my VISA 4532040206203445".

At step 640, the conversational agent says the following to the user: "The order has been placed using your Visa. Your order number is 4532-011a9-3445".

At step 641, the user replies as follows: "Just in case my SSN is 123 213 2323".

It is to be appreciated that while the user's reply at step 631 was required, the user's reply at step 641 was accidental or certainly undesirable in that the information was not requested, not required, and subject the user to vulnerability through, but not limited to, identity theft, fraud, and so forth.

FIG. 7 is a chart showing an exemplary conversation 700 between a person (hereinafter "user") and a conversational agent (e.g., a chatbot) using private information protection, in accordance with an embodiment of the present invention. It is to be appreciated that conversation 700 is similar to conversation 600 with the exception that the information provided by the user is protected using various aspects of the present invention. In this way, a user's private information is not comprised in any manner.

In the chart of FIG. 7, portions of the conversation 700 made by the conversational agent are shown on the left side of FIG. 7, while portions of the conversation 700 made by the user are shown on the right side of FIG. 7.

Hence, in each case, the conversational agent's contribution to the conversations 600 and 700 is the same, that is, the same statements are made in both conversations 600 and 700 by the conversational agent. The difference between the two conversations 600 and 700 is in the user's replies, which are dynamically redacted as necessary in order to protect the private information of the user.

To that end, the user's differing replies, that is the last two replies in steps 631 and 641 are presented below, as they represent the only differences in the conversations 600 and 700, although such differences show the importance of protecting a user's private information.

At step 731, the user reply is dynamically modified to protect the user's private information as follows: "Please use my VISA XXXX-XXXX-XXXX-3445".

At step 741, the user reply is dynamically modified to protect the user's private information as follows: "Just in case my SSN is XXX-XX-2323".

As is evident in comparing steps 631 to 731 and 641 to 741, the present invention advantageously protects the user's private information from unwanted dissemination.

FIG. 8 is a diagram showing exemplary secured entities 800 to which the present invention can be applied, in accordance with an embodiment of the present invention.

The secured entities 800 can include, for example, system entities 810 and user defined entities 820. The system entities 810 can include predefined secured entities for common private information (e.g., credit card number, phone number, SSN, etc.).

In an embodiment, the system entities 810 can be predefined with optional validation (e.g., credit card numbers). The system entities 810 can include, but are not limited to, for example, the following: sys_ssn (SSN); sys_cred_card (credit card number); sys_phone (phone number); and so forth. In the preceding, "sys_" is the prefix used for system entities 810.

The user defined entities 820 can include, but are not limited to, for example, the following: employee_number (employee ID); employee_mail (employee email); and so forth. In an embodiment, the user defined entities 820 can include a synonyms list(s), regular expressions, and so forth. In the preceding, "employee_" is the prefix for user defined entities relating to employees.

It is to be appreciated that the preceding listings of entities and corresponding types of private information are merely illustrative and, thus, other types of entities and corresponding private information can also be configured in accordance with the teachings of the present invention, while maintaining the spirit of the present invention.

Figure 9:
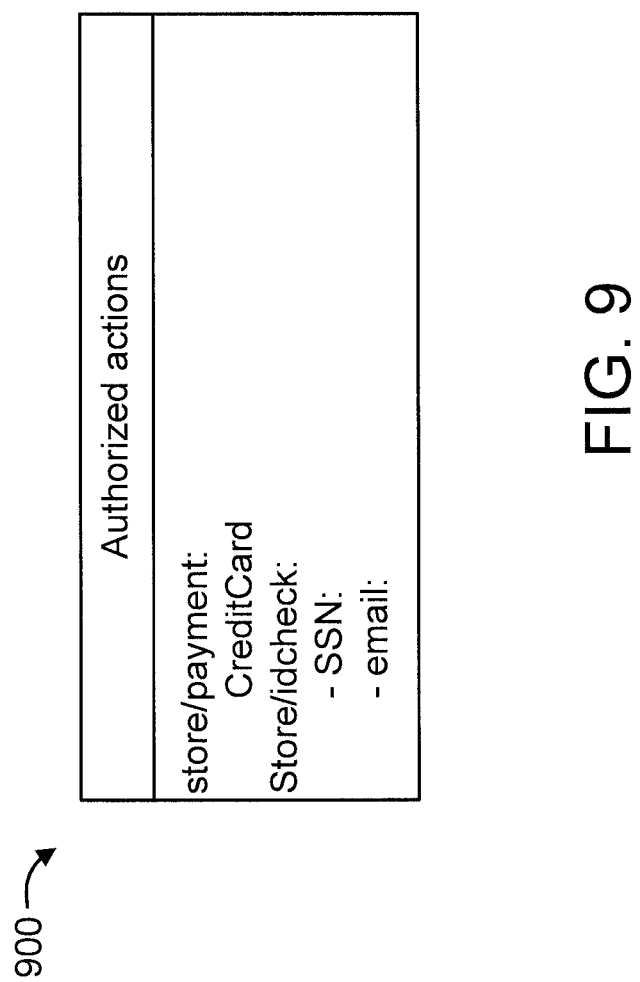
FIG. 9 is a diagram showing exemplary authorized actions to which the present invention can be applied, in accordance with an embodiment of the present invention.

FIG. 9 is a diagram showing exemplary authorized actions 900 to which the present invention can be applied, in accordance with an embodiment of the present invention. While referred to as actions, the same can also be considered as services and/or Application Programming Interfaces (APIs), depending upon the implementation.

The authorized actions 900 can include, but are not limited to, for example, the following: store/payment (CreditCard); store/idcheck (SSN, email, etc.); and so forth. In the preceding example, store/payment is an authorized action, while CreditCard is authorized private information for that action. Moreover regarding the preceding example, store/idcheck is an authorized action, while SSN and email are authorized types of private information for that action.

Hence, the trusted external sources (e.g., 241 of FIG. 2) can receive the preceding types of information relative to the preceding authorized actions, while the untrusted external sources (e.g., 242 of FIG. 2) are prohibited/prevented from receiving the preceding types of information relative to the preceding authorized actions.

It is to be appreciated that the preceding listing of actions and corresponding types of private information are merely illustrative and, thus, other types of actions and corresponding private information can also be configured in accordance with the teachings of the present invention, while maintaining the spirit of the present invention.

In an embodiment, the secured entities 800 and the authorized actions 900 can be included as part of a configuration file that can be used by the present invention. It is to be appreciated that the secured entities 800 can be used (processed) by the filter 310 in order to detect private information in a user input. It is to be further appreciated that the authorized actions 900 can be used (processed) by the redirector 329 in order to determine whether selective decryption is to be performed by the decryption elements 370 that receive authorization to decrypt from the redirector 329.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
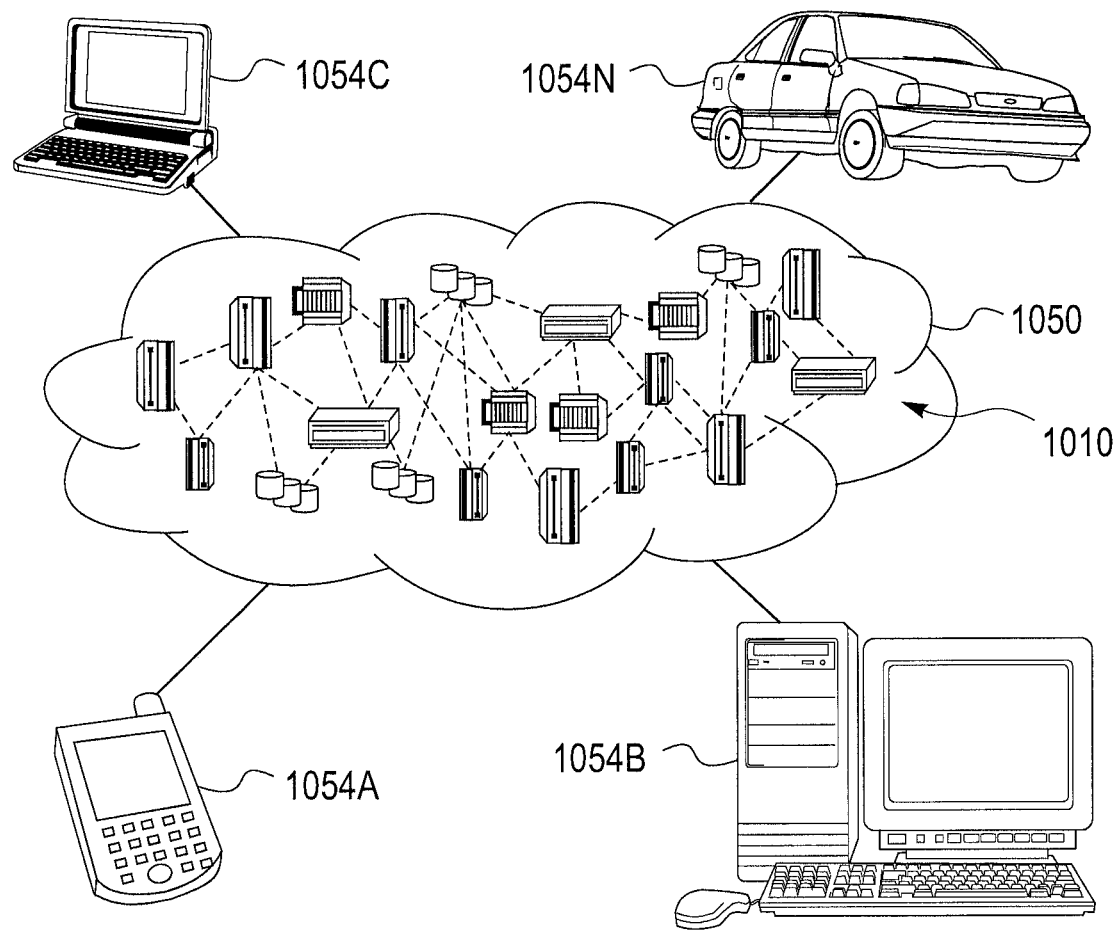
FIG. 10 is a block diagram showing an exemplary cloud computing environment having one or more cloud computing nodes with which local computing devices used by cloud consumers communicate, in accordance with an embodiment of the present invention.

Referring now to FIG. 10, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
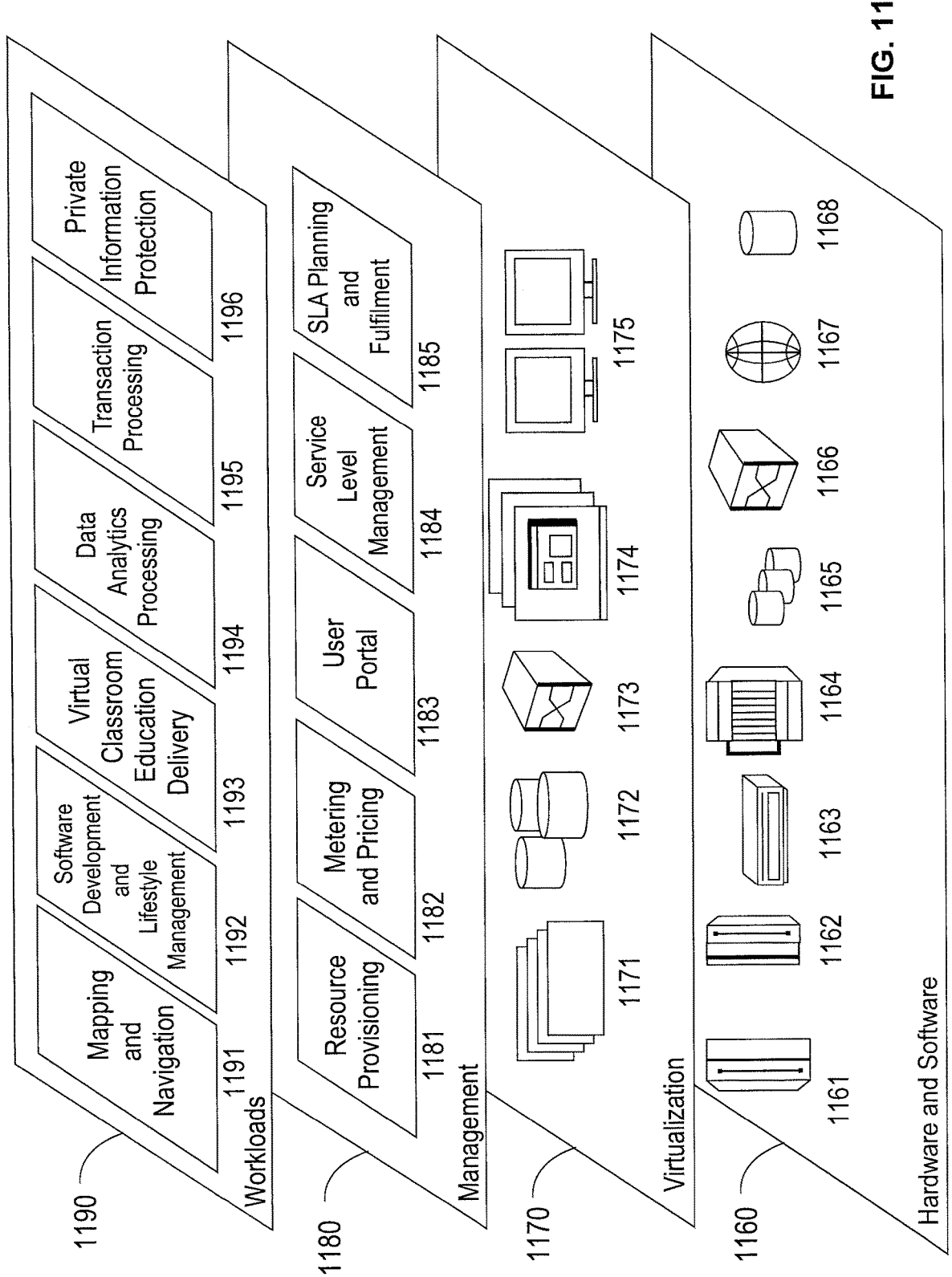
FIG. 11 is a block diagram showing a set of functional abstraction layers provided by a cloud computing environment, in accordance with an embodiment of the present invention.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and configurable and non-invasive protection of private information for conversational agents 1196.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for configurable and non-invasive protection of private information in a user input to a software application that handles real-time information, the method comprising: detecting, by a filter disposed in a user input device, in real-time, private information in the user input received by the user input device;
forming, by the filter, a filtered user input from the user input, by maintaining non-private information from the user input in the filtered user input, extracting and encrypting the private information in the user input and attaching the encrypted private information to the filtered user input, and replacing the private information in the user input with unique identifiers in the filtered user input, the unique identifiers configured to be exploitable by the software application to achieve an intended function of the software application for the user;
transmitting, by a communications redirector, the filtered user input over a communication channel;
and decrypting the encrypted private information for only trusted external sources from among a set of external sources that comprise the trusted external sources and untrusted external sources, and forwarding the decrypted private information to at least one of the trusted external sources over a link of the communication channel.

2. The computer-implemented method of claim 1, wherein the software application employs a conversational agent to interact with the user, and wherein the private information is detected from communications between the user and the conversational agent.

3. The computer-implemented method of claim 1, wherein the private information is user-defined.

4. The computer-implemented method of claim 1, wherein the private information is pre-configured by pre-characterizing the private information for the software application.

5. The computer-implemented method of claim 1, wherein said decrypting step is performed based on a list of items selected from the group consisting of authorized actions, authorized services, and authorized application programming interfaces.

6. The computer-implemented method of claim 1, wherein said detecting step employs natural language understanding and named entity recognition to detect the private information in the user input.

7. The computer-implemented method of claim 1, further comprising:
generating a human-readable reply to the user from the software application, the human readable reply having the private information redacted therefrom; and
providing the user with the human-readable reply.

8. The computer-implemented method of claim 1, further comprising:
storing an original conversational context for the user input in a context database; and
retrieving the original conversational context from the context database and using the original conversational context to detect the private information in the user input.

9. The computer-implemented method of claim 1, wherein the filtered user input is configured to prevent the software application from accessing the private information in the user input initially provided by the user.

10. A computer program product for configurable and non-invasive protection of private information in a user input to a software application that handles real-time information, the computer program product comprising a non-transitory computer readable storage medium having program instructions embodied therewith, the program instructions executable by a computer implemented in a user input device and having, a filter and a communications redirector to cause the computer to perform a method comprising: detecting, by the filter in real-time, private information in the user input received by the user input device;
forming, by the filter, a filtered user input from the user input, by maintaining non-private information from the user input in the filtered user input, extracting and encrypting the private information in the user input and attaching the encrypted private information to the filtered user input, and replacing the private information in the user input with unique identifiers in the filtered user input, the unique identifiers configured to be exploitable by the software application to achieve an intended function of the software application for the user;
transmitting, by the communications redirector, the filtered user input over a communication channel;
and decrypting the encrypted private information for only trusted external sources from among a set of external sources that comprise the trusted external sources and untrusted external sources, and forwarding the decrypted private information to at least one of the trusted external sources over a link of the communication channel.

11. The computer program product of claim 10, wherein the software application employs a conversational agent to interact with the user, and wherein the private information is detected from communications between the user and the conversational agent.

12. A system for configurable and non-invasive protection of private information in a user input to a software application that handles real-time information, the system comprising: a filter, disposed in a user input device, detecting, in real-time, private information in the user input received by the user input device and for forming a filtered user input from the user input, by maintaining non-private information from the user input in the filtered user input, extracting and encrypting the private information in the user input and attaching the encrypted private information to the filtered user input, and replacing the private information in the user input with unique identifiers in the filtered user input, the unique identifiers configured to be exploitable by the software application to achieve an intended function of the software application for the user;
  a communications redirector transmitting the filtered user input over a communication channel;
  and decrypting of the encrypted private information in the filtered user input for only trusted external sources from among a set of external sources that comprise the trusted external sources and untrusted external sources, and forwards the decrypted private information to at least one of the trusted external sources.

13. The system of claim 12, wherein the software application employs a conversational agent to interact with the user, and wherein the private information is detected from communications between the user and the conversational agent.

14. The system of claim 12, wherein the filter is deployed in a user device to filter the private information at a point of origin.

15. The system of claim 12, wherein the filter intercepts the user input during transmission to the software application in order to filter the user input and provides the filtered user input to the software application in place of the user input without filtering.

16. The system of claim 12, further comprising:
  a context database storing an original conversational context for the user input;
  a store processor enabling the storing of the original conversational context in the context database; and
  a load processor retrieving the original conversational context from the context database and using the original conversational context to replace the private information in the user input with the unique identifiers.

17. A computer-implemented method for configurable and non-invasive protection of private information in a user input to a conversational agent that handles real-time information, the method comprising: detecting, by a filter disposed in a user input device in real-time, private information in the user input received by the user input device;
  forming, by the filter, a filtered user input from the user input, by maintaining non-private information from the user input in the filtered user input, extracting and encrypting the private information in the user input and attaching the encrypted private information to the filtered user input, and replacing the private information in the user input with unique identifiers in the filtered user input, the unique identifiers configured to be exploitable by the software application to achieve an intended function of the conversational agent for the user;
  transmitting, by a communications redirector, the filtered user input over a communication channel;
  and decrypting the encrypted private information in the filtered user input for only trusted external sources from among a set of external sources that comprise the trusted external sources and entrusted external sources, and forwards the decrypted private information to at least one of the trusted external sources.

18. The computer-implemented method of 17, further comprising selectively decrypting the encrypted private information for only trusted external sources from among a set of external sources that comprise the trusted external sources and untrusted external sources, and forwarding the decrypted private information to at least one of the trusted external sources over a link of the communication channel.

19. The computer-implemented method of claim 18, wherein said selectively decrypting step is performed based on a list of items selected from the group consisting of authorized actions, authorized services, and authorized application programming interfaces.

20. The computer-implemented method of claim 17, further comprising:
  storing an original conversational context for the user input in a context database; and
  retrieving the original conversational context from the context database and using the original conversational context to detect the private information in the user input.

21. A non-transitory article of manufacture tangibly embodying a computer readable program which when executed causes a computer to perform the steps of claim 17.

22. A system for configurable and non-invasive protection of private information in a user input to a conversational agent that handles real-time information, the system comprising: a filter, disposed in a user input device, detecting, in real-time, private information in the user input received by the user input device, and for forming a filtered user input from the user input, by maintaining non-private information from the user input in the filtered user input, extracting and encrypting the private information in the user input and attaching the encrypted private information to the filtered user input, and replacing the private information in the user input with unique identifiers in the filtered user input, the unique identifiers configured to be exploitable by the software application to achieve an intended function of the conversational agent for the user;
  a communications redirector transmitting the filtered user input over a communication channel;
  and decrypting the encrypted private information in the filtered user input for only trusted external sources from among a set of external sources that comprise the trusted external sources and untrusted external sources, and forwards the decrypted private information to at least one of the trusted external sources.

23. The system of claim 22, wherein the filter intercepts the user input during transmission to the conversational agent in order to filter the user input and provides the filtered user input to the conversational agent in place of the user input without filtering.

* * * * *